United States Patent
Hatakeyama (10) Patent No.: US 11,405,808 B2
(45) Date of Patent: Aug. 2, 2022

(54) COMMUNICATION NORMAL-OPERATION AVAILABILITY CHECKING APPARATUS, COMMUNICATION NORMAL-OPERABILITY CHECKING METHOD, AND PROGRAM

(71) Applicant: NTT Communications Corporation, Chiyoda-ku (JP)

(72) Inventor: Hiroyuki Hatakeyama, Ichikawa (JP)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/770,759

(22) PCT Filed: Oct. 24, 2018

(86) PCT No.: PCT/JP2018/039550
§ 371 (c)(1),
(2) Date: Jun. 8, 2020

(87) PCT Pub. No.: WO2019/116741
PCT Pub. Date: Jun. 20, 2019

(65) Prior Publication Data
US 2021/0176652 A1     Jun. 10, 2021

(30) Foreign Application Priority Data
Dec. 11, 2017 (JP) .............................. JP2017-237113

(51) Int. Cl.
*H04W 24/08* (2009.01)
*H04W 8/08* (2009.01)
(Continued)

(52) U.S. Cl.
CPC ........... *H04W 24/08* (2013.01); *H04W 8/082* (2013.01); *H04W 8/10* (2013.01); *H04W 48/14* (2013.01)

(58) Field of Classification Search
CPC ........ H04W 8/02; H04W 8/10; H04W 48/14; H04W 24/08; H04W 8/082; H04W 48/18;
(Continued)

(56) References Cited

U.S. PATENT DOCUMENTS

| 7,430,416 B2 * | 9/2008 | Ando ..................... H04W 8/10 455/433 |
| 8,306,532 B2 * | 11/2012 | Rahman ................ H04W 48/18 455/432.1 |

(Continued)

FOREIGN PATENT DOCUMENTS

| JP | 2003-111143 A | 4/2003 |
| JP | 2008-263304 A | 10/2008 |

(Continued)

OTHER PUBLICATIONS

Extended European Search Report dated Dec. 21, 2020 in European Patent Application No. 18889408.3, 9 pages.
(Continued)

*Primary Examiner* — Man U Phan
(74) *Attorney, Agent, or Firm* — Oblon, McClelland, Maier & Neustadt, L.L.P.

(57) ABSTRACT

A communication normal-operation availability checking apparatus is provided for checking normal-operation availability of communications that go through a first network, a second network and a third network. The communication normal-operation availability checking apparatus includes: a list generation unit configured to generate a list including one or more carriers that provide a detectable first network; and a checking unit configured to check the normal-operation availability of the communications by executing a test that goes through the first network based on the list.

7 Claims, 6 Drawing Sheets

(51) Int. Cl.
*H04W 8/10* (2009.01)
*H04W 48/14* (2009.01)

(58) Field of Classification Search
CPC ... H04W 24/10; H04W 8/08; H04M 2207/18; H04M 3/28; H04M 3/24
USPC .......................................................... 370/329
See application file for complete search history.

(56) References Cited

U.S. PATENT DOCUMENTS

| | | | | |
|---|---|---|---|---|
| 8,351,929 | B2* | 1/2013 | Izawa | H04W 48/08 455/432.1 |
| 8,825,876 | B2* | 9/2014 | Krishnaswamy | H04M 3/4228 709/228 |
| 9,237,443 | B2* | 1/2016 | Kocsis | H04L 63/0853 |
| 10,433,156 | B1* | 10/2019 | Long | H04W 8/265 |
| 10,555,247 | B2* | 2/2020 | Dang | H04W 8/18 |
| 10,602,432 | B2* | 3/2020 | Kim | H04W 8/183 |
| 2004/0110503 | A1* | 6/2004 | Park | H04W 8/08 455/437 |
| 2007/0265021 | A1* | 11/2007 | Igaue | H04W 8/04 455/461 |
| 2009/0325574 | A1 | 12/2009 | Izawa et al. | |
| 2010/0136967 | A1* | 6/2010 | Du | H04W 8/205 455/432.1 |
| 2010/0267383 | A1* | 10/2010 | Konstantinou | H04W 48/18 455/435.2 |
| 2015/0312699 | A1* | 10/2015 | Rodgers | H04L 67/16 455/418 |

FOREIGN PATENT DOCUMENTS

| | | |
|---|---|---|
| JP | 4283818 B2 | 6/2009 |
| JP | 2010-11020 A | 1/2010 |
| JP | 5863185 B2 | 2/2016 |

OTHER PUBLICATIONS

International Search Report dated Jan. 22, 2019 in PCT/JP2018/039550 filed on Oct. 24, 2018, 2 pages.

* cited by examiner

COMMUNICATION NORMAL-OPERATION AVAILABILITY CHECKING APPARATUS, COMMUNICATION NORMAL-OPERABILITY CHECKING METHOD, AND PROGRAM

FIELD OF THE INVENTION

The present invention relates to a technique for checking communication normal-operation availability in a network.

BACKGROUND OF THE INVENTION

International roaming services have become popular which allows mobile terminals such as smart phones subscribed in Japan to be also usable overseas.

By using the international roaming services, it is possible for a user of a mobile terminal subscribed in Japan to continue to use the mobile terminal even if the user goes overseas.

In general, an international roaming service is realized by connecting an international relay network including a GRX (GRPS Roaming eXchange), etc., to a carrier network of each country via a network connection apparatus. It should be noted that a "carrier" is used to refer to a "telecommunications carrier (provider)" in this specification.

CITATION LIST

Patent Document

[Patent Document 1] Japanese Patent No. 5863185

SUMMARY OF THE INVENTION

Technical Problem

It is necessary for carriers providing international roaming services to always check whether users can use their international roaming services in a normal manner overseas. In order to check the normal-operation availability, a person in charge in the carrier may go abroad with a mobile terminal and manually check connections.

However, the manually checking overseas requires time and costs and it is difficult to continue checking at all times.

The present invention has been made in view of the above, and it is an object of the present invention to provide a technique that enables to automatically perform normal-operation availability checking of communications that go through a plurality of networks.

Solution to Problem

According to an embodiment of the present invention, a communication normal-operation availability checking apparatus is provided for checking normal-operation availability of communications that go through a first network, a second network and a third network. The communication normal-operation availability checking apparatus includes: a list generation unit configured to generate a list including one or more carriers that provide a detectable first network; and a checking unit configured to check the normal-operation availability of the communications by executing a test that goes through the first network based on the list.

Advantageous Effects of Invention

According to an embodiment of the present invention, a technique is provided which enables to automatically perform normal-operation availability checking of communications that go through a plurality of networks.

DETAILED DESCRIPTION OF THE PREFERRED EMBODIMENTS

In the following, referring to the drawings, one or more embodiments of the present invention will be described. Embodiments described below are just examples. Embodiments of the present invention are not limited to the following embodiments. For example, embodiments described below are targeted to international roaming services. However, the present invention is not limited to be applied to international roaming services. For example, the present invention may be used for checking connectivity of communications that connect a plurality of domestic networks.

Furthermore, in one or more embodiments described below, it is assumed that a Japanese (referred to as "domestic") carrier provides international roaming services between Japan and countries other than Japan (referred to as "overseas"). However, a provider (carrier) and a country of the international roaming services, to which the present invention is applied, may be any provider (carrier) and country, and are not limited to a specific provider (carrier) and a country.

Overall Configuration of System

Figure 1:
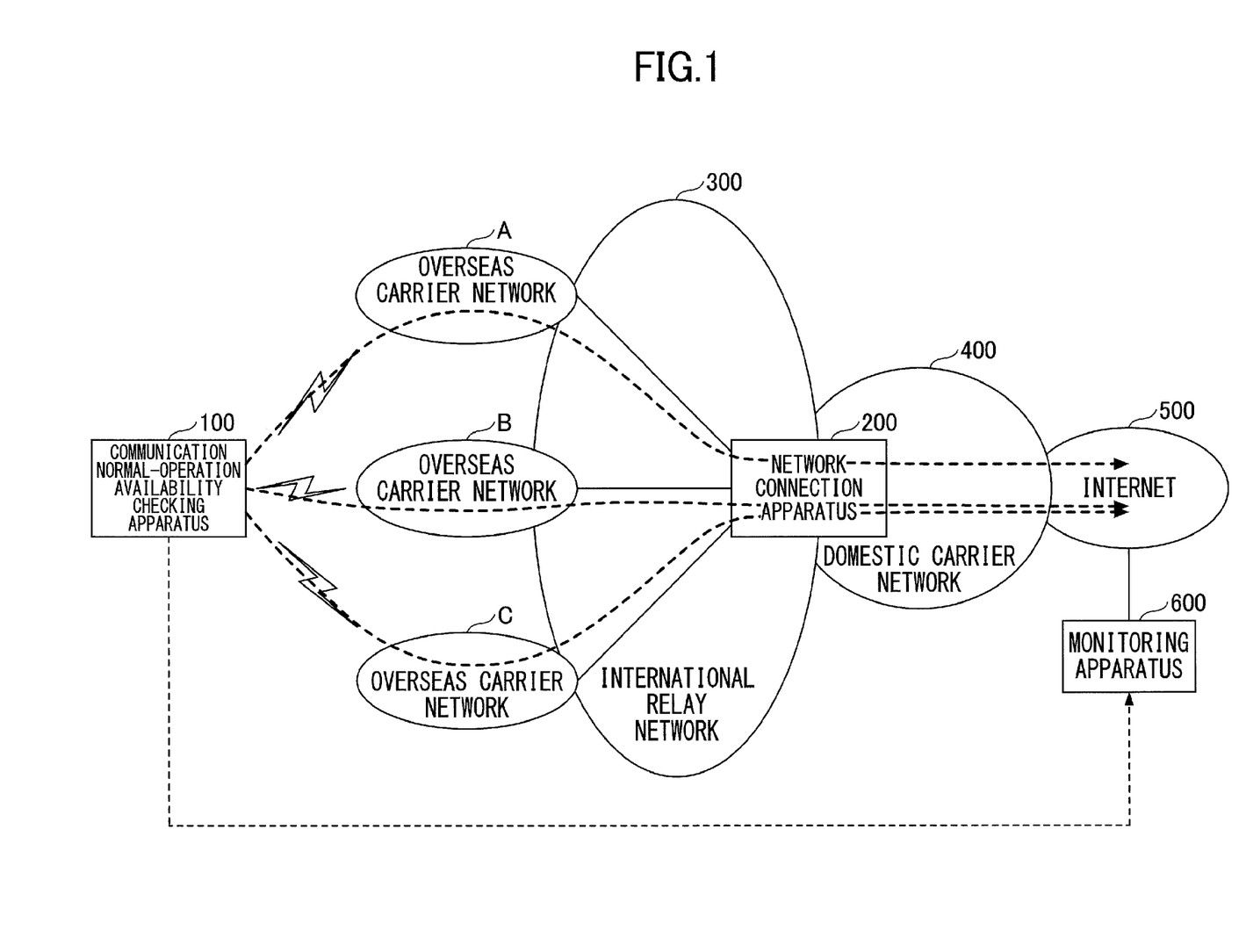
FIG. 1 is a drawing illustrating a configuration diagram of a communication system according to an embodiment of the present invention.

FIG. 1 is a drawing illustrating a configuration diagram of a communication system according to an embodiment of the present invention. As illustrated in FIG. 1, the communication system includes an international relay network 300, a domestic carrier network 400, and overseas carrier networks A to B. The international relay network 300 and the domestic carrier network 400 are connected by a network connection apparatus 200. The network connection apparatus 200 is provided by, for example, a carrier that provides international roaming services and checks communication normal-operation availability according to an embodiment of the present invention. Further, the international relay network 300 and each of the overseas carrier networks A to C are connected.

The domestic carrier network 400 is, for example, a network that is provided by a domestic mobile carrier. Each of the overseas carrier networks A to C is a network that is provided by a mobile carrier in an overseas country.

A monitoring apparatus 600 is connected to the Internet 500 that is connected to the domestic carrier network 400, and the monitoring apparatus 600 receives a report of a normal-operation availability checking result from a communication normal-operation availability checking apparatus 100 via the overseas carrier networks.

The communication normal-operation availability checking apparatus 100 is an apparatus that is installed in an overseas base (office). In FIG. 1, as a typical example, the communication normal-operation availability checking apparatus 100 is installed in an office of a country in which the overseas carriers A to C are provided. In a real case, the communication normal-operation availability checking apparatus 100 is installed in each of a plurality of countries, and a plurality of communication normal-operation availability checking apparatuses 100 are installed in a plurality of offices in each country.

In an arrangement illustrated in FIG. 1, the communication normal-operation availability checking apparatus 100 periodically performs connection tests: for each carrier whose radio waves are receivable; and for each communication method (GSM (registered trade mark), 3G, LTE, 5G, or the like), and transmits/indicates test results to the monitoring apparatus 600. The connection tests are performed by, for example, performing/executing "Ping" directed to a predetermined server provided in the Internet 500. However, this is just an example.

Further, the communication normal-operation availability checking apparatus 100 periodically performs dead-or-alive checking with respect to a communication unit (mobile communication device that will be described below), and has a function of autonomously and automatically solving a problem by performing restart, etc., when there is a problem.

In a communication system according to an embodiment of the present invention, the communication normal-operation availability checking apparatus 100 installed in a local office is supposed to autonomously perform testing and to indicate test results to a person in charge of monitoring in a remote office, and thus, the communication normal-operation availability checking apparatus 100 is not controlled from a network side or from a remote office.

Configuration Example of Communication Normal-operation Availability Checking Apparatus 100

The communication normal-operation availability checking apparatus 100 includes a function of a mobile terminal capable of using international roaming services according to an embodiment of the present invention, and a function of checking communication normal-operation availability.

Figure 2:
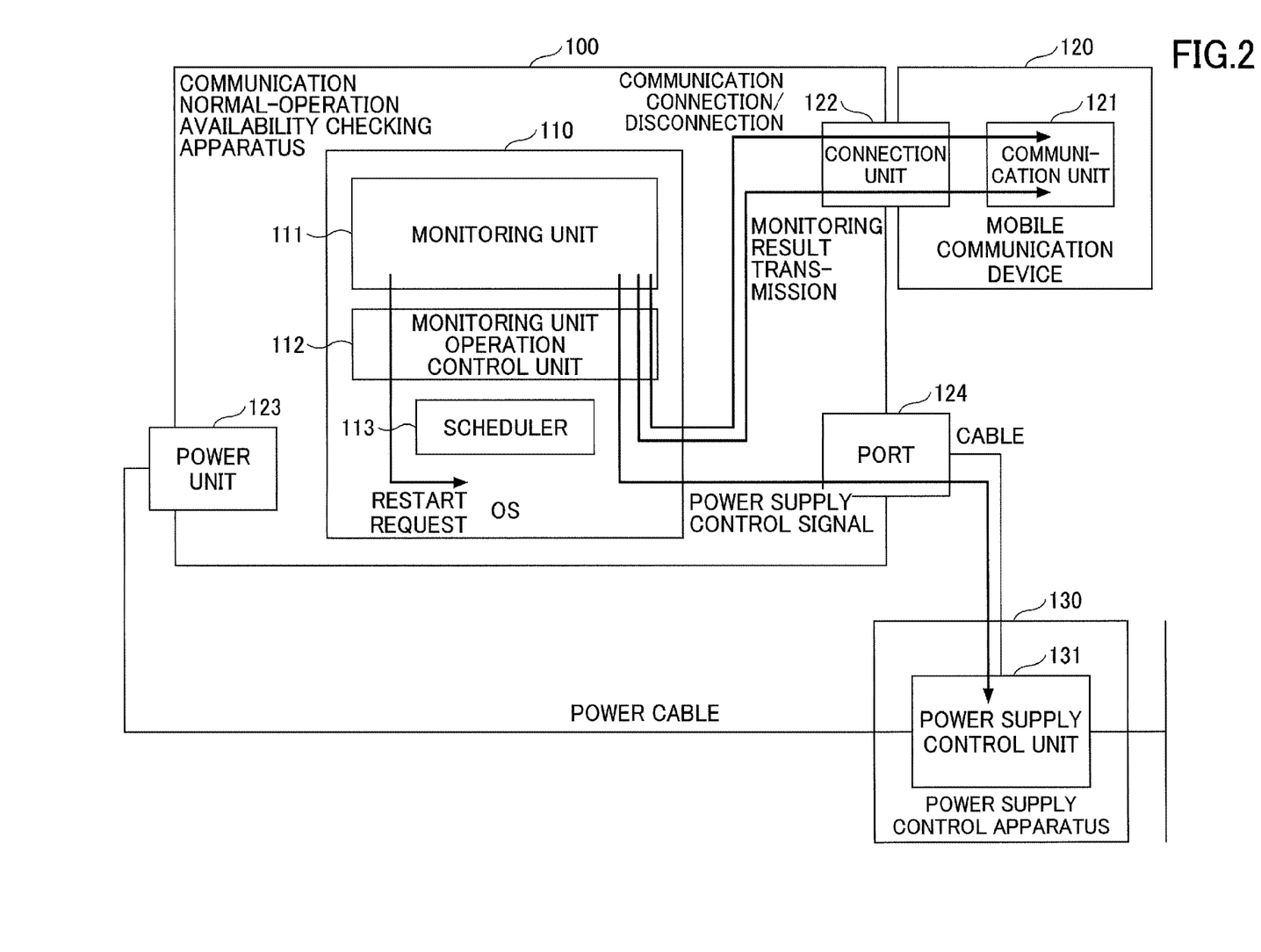
FIG. 2 is a drawing illustrating an example of a structure of a communication normal-operation availability checking apparatus 100.

FIG. 2 illustrates an example of a configuration of a communication normal-operation availability checking apparatus 100. In FIG. 2, a mobile communication device 120 is physically connected to the communication normal-operation availability checking apparatus 100 via a connection unit 122. However, the mobile communication device 120 may be a built-in device of the communication normal-operation availability checking apparatus 100. In any case, the communication normal-operation availability checking apparatus 100 includes the mobile communication device 120 in a case where the communication normal-operation availability checking apparatus 100 is used.

It should be noted that the mobile communication device 120 may include functions of the communication normal-operation availability checking apparatus 100 according to an embodiment of the present invention. In such a case, the mobile communication device 120 itself may be referred to as the communication normal-operation availability checking apparatus 100.

The mobile communication device 120 according to an embodiment of the present invention is assumed to be a USB (registered trademark) type mobile terminal, the communication normal-operation availability checking apparatus 100 is assumed to be a PC (personal computer), and the connection unit 122 is assumed to be a USB (registered trademark) interface. These assumptions are just examples.

The mobile communication device 120 includes a communication unit 121 that performs connection tests, etc., for each carrier and for each communication method based on control from a monitoring unit 111.

As illustrated in FIG. 2, the communication normal-operation availability checking apparatus 100 includes the monitoring unit 111, a monitoring unit operation control unit 112, and a scheduler 113. In an embodiment of the present invention, the monitoring unit 111, the monitoring unit operation control unit 112, and the scheduler 113 are each realized by programs, and thus, it is illustrated in the figure that the monitoring unit 111, the monitoring unit operation control unit 112, and the scheduler 113 run on an OS (operating system) 110. However, this is just an example, and the monitoring unit 111, the monitoring unit operation control unit 112, and the scheduler 113 may be function units independent from the OS.

The monitoring unit operation control unit 112 is, for example, an interpreter, or the like, that causes the monitoring unit 111 as a program to run. The scheduler 113 periodically activates the monitoring unit 111 to perform communication normal-operation availability checking operations.

The monitoring unit 111 performs overall operations of checking communication normal-operation availability. For example, the monitoring unit 111 performs connecting communications, testing, and disconnecting communications for each carrier and for each communication method, and transmits the results as test results via the mobile communication device 120. Further, the monitoring unit 111 is capable of restarting the mobile communication device 120 by outputting a restart request for the mobile communication device 120 (more specifically, a deactivation request and an activation request). Further the monitoring unit 111 is capable of restarting the communication normal-operation availability checking apparatus 100 by outputting a restart request for the communication normal-operation availability checking apparatus 100 itself (i.e., OS). Furthermore, the monitoring unit 111 is capable of turning ON/OFF of a power supply of the communication normal-operation availability checking apparatus 100 by transmitting a power supply control signal for a power supply control apparatus 130 (an example of an external apparatus) that will be described below. Specific operation contents of the monitoring unit 111 will be described below by referring to a flowchart.

Further, the communication normal-operation availability checking apparatus 100 includes a power supply unit 123. The power supply unit 123 is connected to a power supply apparatus 130 that supplies power via a power supply cable. The power supply unit 130 includes a power supply control unit 131, and the power supply control unit 131 is connected to the communication normal-operation availability checking apparatus 100 via a port 124 using, for example, LAN. The power supply control unit 131 is capable of turning ON/OFF of a power supply of the communication normal-operation availability checking apparatus 100 based on a power supply control signal received from the communication normal-operation availability checking apparatus 100.

Hardware Structure Example

The communication normal-operation availability checking apparatus 100 described above may be realized, for example, by causing a computer to execute a program in which processing contents are described according to an embodiment of the present invention. In other words, the communication normal-operation availability checking apparatus 100 may be realized by executing a program corresponding to processing performed by the communication normal-operation availability checking apparatus 100 using hardware resources such as a CPU, a memory, etc., included in the computer. With respect to the program described above, it is possible to write the program in a computer-readable recording medium (portable memory, or the like), to store the program, and to distribute the program. Further, it is possible to provide the above-described program through a network such as the Internet, email, etc.

Figure 3:
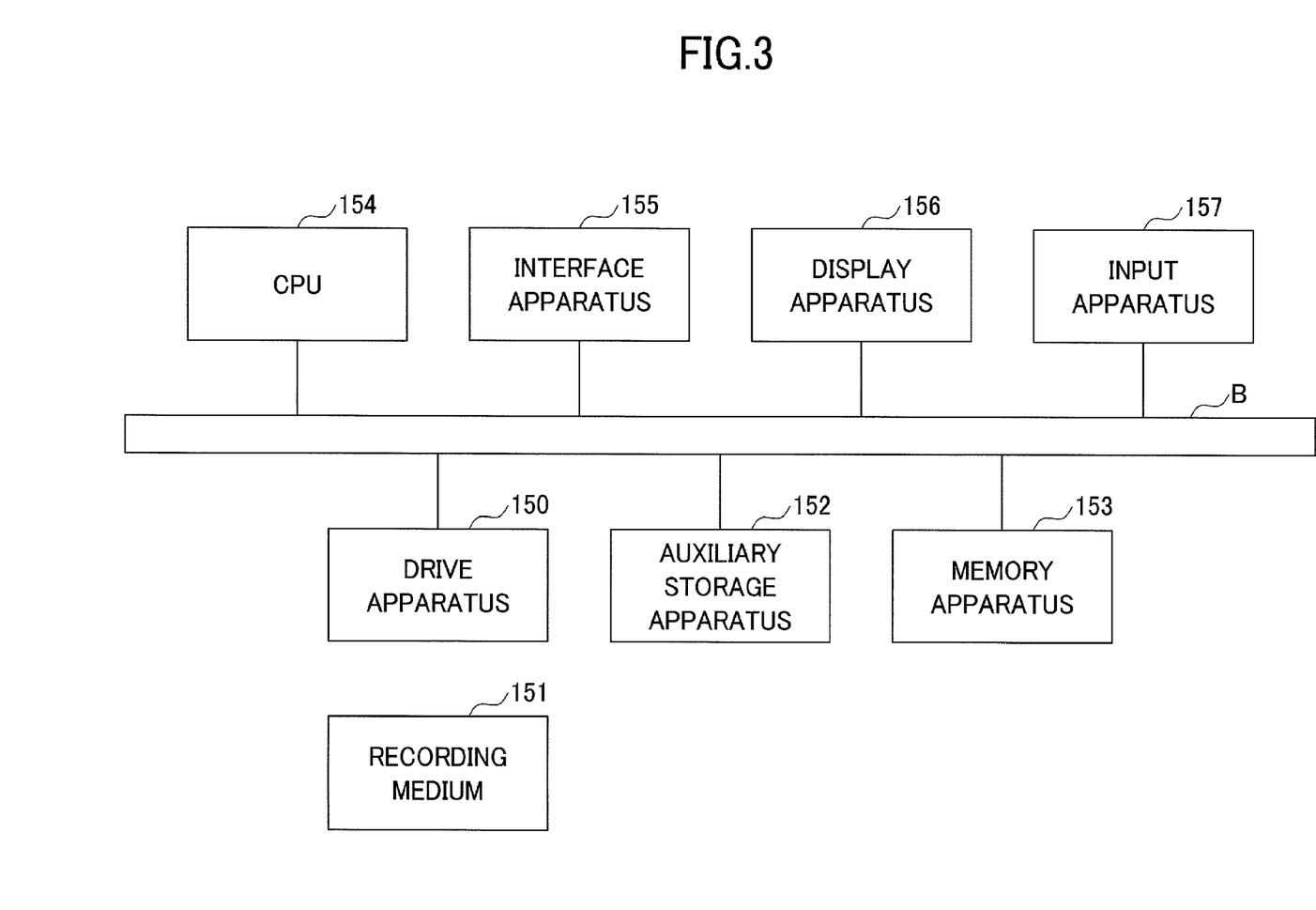
FIG. 3 is a drawing illustrating an example of a hardware structure of a communication normal-operation availability checking apparatus 100.

FIG. 3 is a drawing illustrating an example of a hardware structure of the above-described computer according to an embodiment of the present invention. The computer illustrated in FIG. 3 includes a drive apparatus 150, an auxiliary storage apparatus 152, a memory apparatus 153, a CPU 154, an interface apparatus 155, a display apparatus 156, an input apparatus 157, etc., which are connected to each other via a bus B.

A program realizing processes of the communication normal-operation availability checking apparatus 100 is provided, for example, by a recording medium 151 such as a CD-ROM, a memory card, or the like. When the recording medium 151 storing the program is set to the drive apparatus 150, the program is installed from the recording medium 151 to the auxiliary storage apparatus 152 through the drive apparatus 150. With respect to the above, the installation of the program is not necessarily performed by using the recording medium 151, and the program may be downloaded from other computers via a network. The auxiliary storage apparatus 152 stores not only the installed program but also necessary files, data, etc.

The memory apparatus 153 is used for storing the program after reading the program from the auxiliary storage apparatus 152 when the program is instructed to start. The CPU 154 realizes functions related to the apparatus according to the program stored in the memory apparatus 153. The interface apparatus 155 is used as an interface for connecting to a network. The interface apparatus 155 includes, for example, a mobile communication device 120.

The display apparatus 156 displays a GUI (Graphical User Interface), or the like, according to the program. The input apparatus 157 includes a keyboard, a mouse, a button, or, a touch panel, etc., and is used for inputting various operational instructions. It should be noted that, in an embodiment of the present invention, it is possible for the communication normal-operation availability checking apparatus 100 to operate automatically, and thus, the display apparatus 156 and the input apparatus 157 may not be included.

Operation Example of Communication
Normal-operation Availability Checking Apparatus
100

Figure 4:
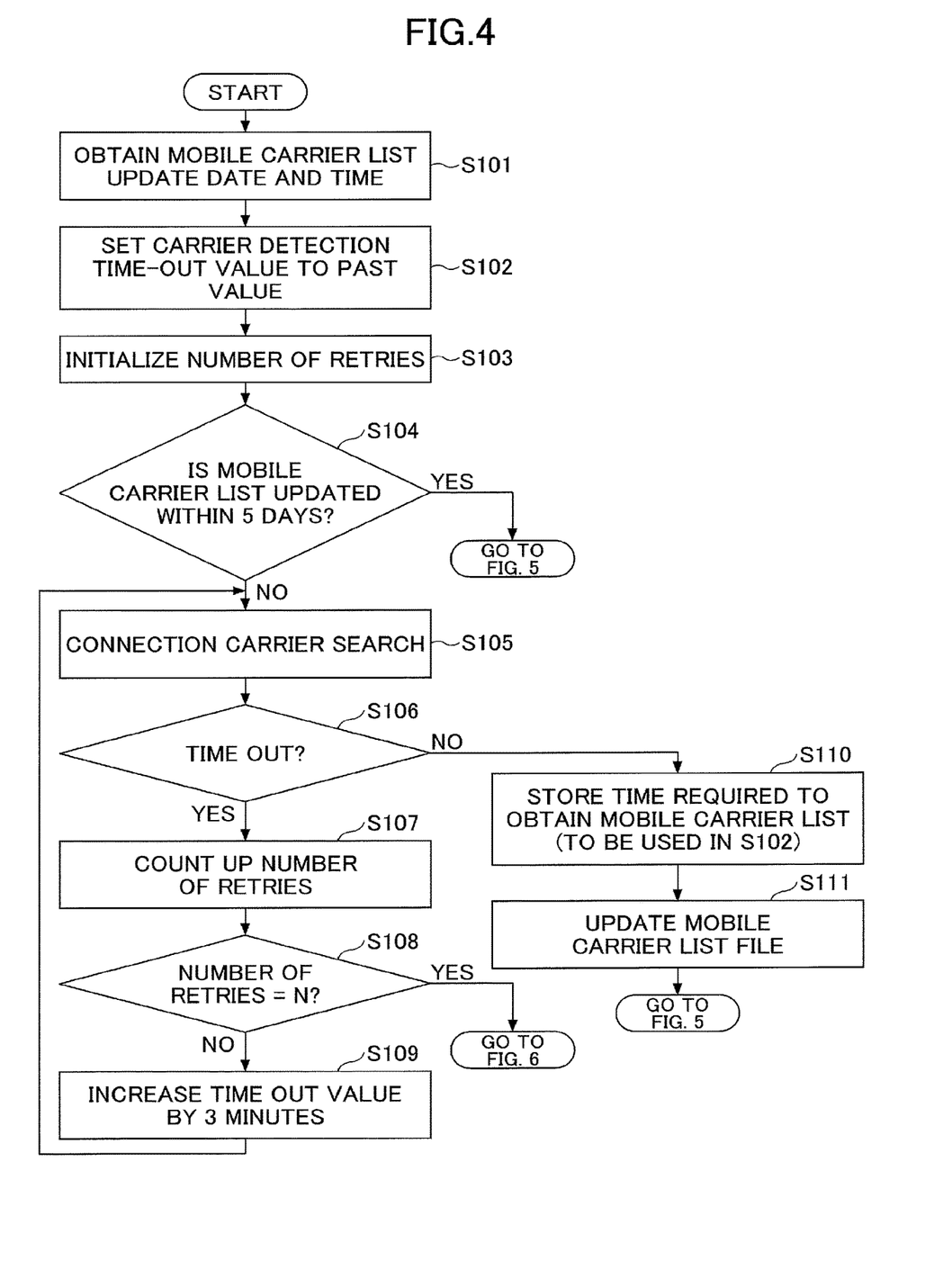
FIG. 4 is a flowchart illustrating an operation example of a communication normal-operation availability checking apparatus 100.
Figure 5:
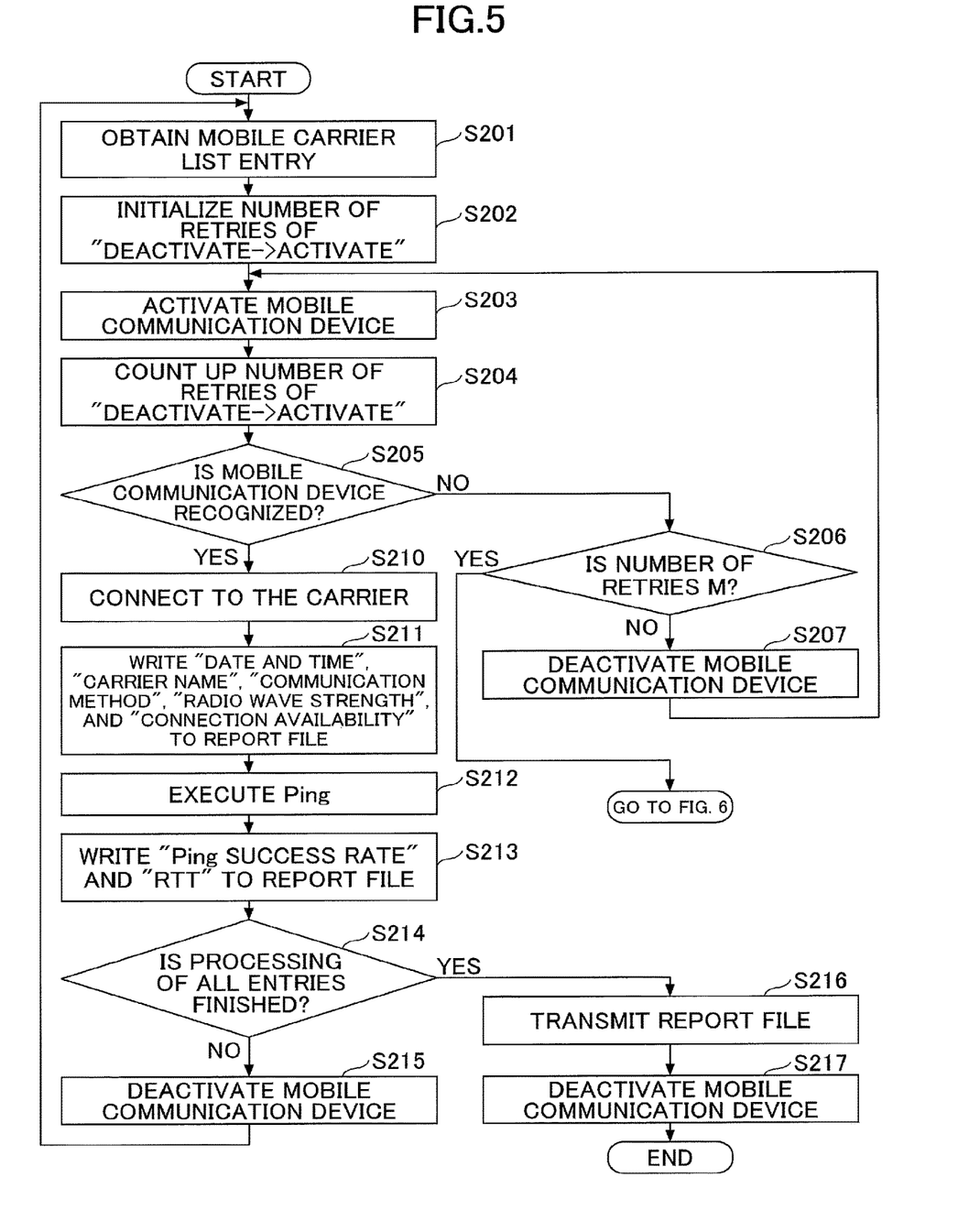
FIG. 5 is a flowchart illustrating an operation example of a communication normal-operation availability checking apparatus 100.

Next, operation examples of the communication normal-operation availability checking apparatus 100 will be described by referring to flowcharts illustrated in FIGS. 4 to 6. The following operations are mainly performed by the monitoring unit 111. "S" in the figure stands for "step". The following operations are periodically performed by the monitoring unit 111 by, for example, having the monitoring unit 111 activated at a constant time interval by the scheduler 113.

Mobile Carrier List Update (Generation) Process

In S101, the monitoring unit 110 obtains mobile carrier list update date and time stored in a storage means (memory, or the like). The mobile carrier list is a list of carrier names and communication methods for each carrier for which connection is checked. A process illustrated in FIG. 4 is a mobile carrier list update process. FIG. 4 illustrates a case in which a mobile carrier list already exists and the mobile carrier list is updated. A process illustrated in FIG. 4 corresponds to a mobile carrier list generation process if the process starts from a state in which the mobile carrier list does not exist. It should be noted that "generation" may be used as including "update".

In S102, the monitoring unit 111 sets a carrier detection time-out value to a past value. The carrier detection time-out value is time waiting for achieving detection of an overseas carrier network whose radio waves are receivable (this is referred to as "carrier detection") in a carrier detection process. The past value is time from transmission of a command for carrier detection to achieving the carrier detection in the previous update (generation) process. It should be noted that a predefined value (e.g., 15 minutes) is used in a case where there is no past value. It should be noted that "15 minutes" is just an example, and the value may be a value other than 15 minutes.

In S103, the monitoring unit 111 initializes a number of retries (sets zero (0)). The number of retries is a number of times for performing the carrier detection by issuing a command again after the time-out of the carrier detection.

In S104, the monitoring unit 111 determines whether the mobile carrier list is updated within 5 days based on: the mobile carrier list update date and time obtained in S101; and current date and time. It should be noted that the threshold value "5 days" is just an example. Further, the unit of the threshold is not limited to "days". The unit may be "hours", "minutes", "seconds", or other units. In a case where the determination in S104 is "Yes", the process proceeds to a process (connection test process) illustrated in FIG. 5. In a case where the determination in S104 is "No", the process proceeds to S105.

In S105, the monitoring unit 111 transmits a command to a communication unit 121 and causes the communication unit 121 to search for a network and a communication method of a carrier to which the communication unit 121 can be connected (of which the communication unit 121 can receive radio waves with radio strength greater than a predetermined strength). It should be noted that a technique for searching for a carrier belongs to a known technique. For example, when the searching is successful, the communication unit 121 obtains a name of a carrier whose radio waves are received and a communication method for each carrier, and transmits these information items to the monitoring unit 111. When the searching is not successful, the communication unit 121 waits for a success until the time-out time.

In S106, the monitoring unit 111 determines whether the carrier searching has reached the time-out time. In a case where the time-out time is not reached (No in S106), the process proceeds to S110.

In a case where the time-out time is reached (Yes in S106), the process proceeds to S107, and the monitoring unit 111 counts up the number of retries. In S108, the monitoring unit 111 determines whether the number of retries has reached N. It should be noted that N is an integer equal to or greater than 1, and may be 4, for example. However, N=4 is just an example.

Figure 6:
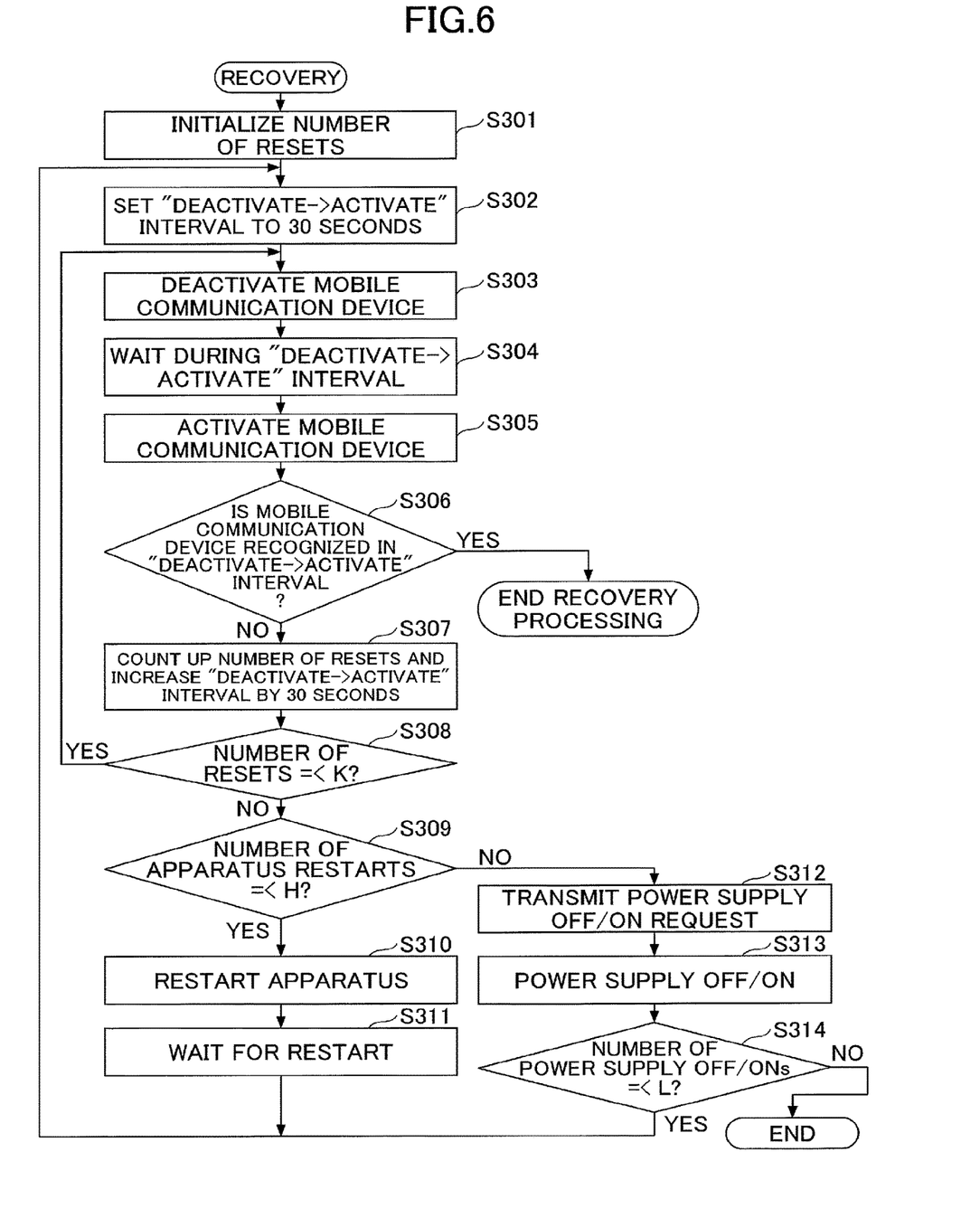
FIG. 6 is a flowchart illustrating an operation example of a communication normal-operation availability checking apparatus 100.

When the determination in S108 is Yes, the process moves to a recovery process illustrated in FIG. 6. When the determination in S108 is No, the time-out value is increased by 3 minutes, the process returns to S105, and the carrier search is performed again. In the re-performed carrier search, the time-out value has been increased from the previous search, and thus, if the re-performed carrier search is not successful, the monitoring unit 111 waits for longer time. It should be noted that "3 minutes" is just an example.

In S110 (in case of No in S106 (in a case where the carrier search is successful)), the monitoring unit 111 stores time required for the successful carrier search (i.e., the time from command transmission to mobile carrier list acquisition) in a storage means such as a memory. The stored value corresponds to the past value used in S102.

In S111, the monitoring unit 111 updates a mobile carrier list file. It should be noted that, if the mobile carrier list file does not exist in advance, the mobile carrier list file is generated. As an example, the mobile carrier list is a list of (carrier name, communication method). For example, it is assumed that there are a carrier A and a carrier B, the carrier A provides GSM (registered trademark) and LTE, the carrier B provides 3G, LTE, and 5G, and these carriers and communication methods are detected in the carrier search. In this case, the mobile carrier list will be a list of {(carrier A, GSM (registered trademark)), (carrier A, LTE), (carrier B, 3G), (carrier B, LTE), (carrier B, 5G)}. After S111, the process transitions to a connection test process illustrated in FIG. 5.

It should be noted that, even if the mobile communication device 120 detects radio waves of an overseas carrier network, there may be a case where communications using the overseas carrier network are not available if there is no international roaming services providing agreement between the domestic carrier and the overseas carrier. Whether international roaming services are provided between a domestic carrier and an overseas carrier is disclosed in the Web sites of the domestic carriers. Therefore, for example, the communication normal-operation availability checking apparatus 100 may periodically access the Web site, may check international roaming services providing agreement information between the domestic carrier and overseas carriers, and may perform generation/update of the mobile carrier list with respect to overseas carrier networks for which international roaming services between the domestic carrier and the overseas carriers are provided.

Connection Test Process

In S201, the monitoring unit 111 obtains a first entry of the mobile carrier list (e.g., carrier A, GSM (registered trademark)).

In an embodiment of the present invention, in order to perform dead-or-alive checking with respect to the mobile communication device 120, the monitoring unit 111 may deactivate and then activate the mobile communication device 120 by transmitting commands to the communication unit 121, and thereafter, the monitoring unit 111 may perform a process (also referred to as a restart process) for checking whether the mobile communication device 120 is recognized. The number of retries of the process is referred to as a "number of deactivate→activate retries". In S202, the number of deactivate→activate retries is initialized (is set to zero(0)).

The monitoring unit 111 activates the mobile communication device 120 (S203), counts up the number of deactivate→activate retries (S204), and checks whether the mobile communication device 120 is recognized (S205). "The mobile communication device 120 is recognized" may be referred to as "it is confirmed that the mobile communication device 120 operates normally".

In a case where the checking result in S205 is No (in a case where the mobile communication device 120 is not recognized), the process proceeds to S206, and, in a case where the number of retries has reached M (Yes in S206), the process proceeds to a recovery process illustrated in FIG. 6. It should be noted that M is an integer equal to or greater than 1, and may be 4, for example. However, M=4 is just an example. In a case where the number of retries has not reached 4 (No in S206), the monitoring unit 111 deactivates the mobile communication device (S207), returns to S203, and performs processes from S203.

In S210 (a case where the checking result in S205 is Yes), the monitoring unit 111 performs connection to a network of the carrier (carrier and communication method of the current entry) by using the mobile communication device 120.

In S211, the monitoring unit 111 writes current date and time, a name of a connecting carrier, a communication method, a radio wave strength, and connection availability into a report file. It should be noted that, in a case where the report file does not exist, the monitoring unit 111 generates a report file and writes the above into the report file. Here, it is assumed that the connection is available, and the process proceeds to S212. It should be noted that, in a case where the connection is not available, the same is written into the report file and the following Ping is not performed.

In S212, the monitoring unit 111 performs Ping. According to the above, a Ping packet is transmitted from the mobile communication device 120, and reaches a destination server if there is no problem in a communication state of the communication path, and a response is returned. According to the above, it is possible to perform checking communications and measuring delay time. Ping is performed multiple times.

In S213, the monitoring unit 111 writes a Ping success rate ("the number of successful response reception times" divided by "the number of Ping performing times") and RTT (Round Trip Time (corresponding to delay time)) obtained by performing Ping into the report file.

In S214, the monitoring unit 111 determines whether processing for all entries in the mobile carrier list is finished, proceeds to S215 in a case where the determination is No (in a case where there are unprocessed entries), deactivates the mobile communication device 120, and proceeds to a process of the next entry.

In a case where processing for all entries is finished (Yes in S214), the process proceeds to S216, the monitoring unit 111 transmits the report file to the monitoring apparatus 600 by using an overseas carrier network to which the mobile communication device 120 can be connected, deactivates the mobile communication device 120 in S217, and ends the process. It should be noted that the transmission of the report file may be performed by using API or by using email.

It should be noted that, in a case where all of the overseas carrier networks become communicatively unavailable and thus there is no overseas carrier network that can be used for transmitting the report file, the monitoring unit 111 keeps storing the report file in the storage means until an overseas carrier network that can be used for transmitting the report file is detected, and, when an overseas carrier network that can be used is detected, the monitoring unit 111 connects to the overseas carrier network and transmits the report file.

Recovery Process

Next, recovery process procedures will be described by referring to FIG. 6.

In S301, the monitoring unit 111 initializes a number of resets (sets zero (0)). The number of resets is a number of times of restarting (deactivate→activate) the mobile communication device 120. Next, in S302, the monitoring unit 111 sets a "deactivate→activate" interval to 30 seconds. It should be noted that setting the interval to 30 seconds is just an example. The "deactivate→activate" interval is time for waiting for the mobile communication device 120 to be recognized after activating the deactivated mobile communication device 120. Further, the "deactivate→activate" interval is also time that elapses before the activation of the mobile communication device 120 after the deactivation of the mobile communication device 120.

In S303, the monitoring unit 111 deactivates the mobile communication device 120 (S303), and waits during the above-described interval (S304).

The monitoring unit 111 activates the mobile communication device 120 (S305). If the mobile communication device 120 is recognized before elapsing of "deactivate→activate" interval (Yes in S306), the monitoring unit 111 ends the recovery process and returns to the process before the recovery process.

If the mobile communication device 120 is not recognized before elapsing of "deactivate→activate" interval (No in S306), the monitoring unit 111 counts up the number of resets and increases the value of "deactivate→activate" interval by 30 seconds from the current value (S307). It should be noted that 30 seconds is just an example.

In S308, the monitoring unit 111 determines whether the number of resets is equal to or less than K. It should be noted that K is an integer equal to or greater than 1, and may be 4, for example. However, K=4 is just an example. In case of Yes in S308, the monitoring unit 111 returns to S303 and performs processing from S303 again.

In case of No in S308 (in a case where the number of resets exceeds K), if the number of restarts of the communication normal-operation availability checking apparatus 100 is equal to or less than H (Yes in S309), the monitoring unit 111 restarts the communication normal-operation availability checking apparatus 100 by issuing a command to OS (S310). It should be noted that H is an integer equal to or greater than 1, and may be 4, for example. However, H=4 is just an example. After waiting for the restart of the apparatus and the monitoring unit 111, the process returns to S302 and processing from S302 is performed again.

In a case where the number of restarts of the communication normal-operation availability checking apparatus 100 exceeds H (No in S309), the monitoring unit 111 transmits, to the power supply control apparatus 130, a request for power supply OFF/ON control (S312). The power supply OFF and ON operation of the communication normal-operation availability checking apparatus 100 is performed by the power supply control apparatus 130 (S313). If the number of power supply OFF/ON operations is equal to or less than L (Yes in S314), after the start, the process returns to S302 and processing from S302 is performed again. It should be noted that L is an integer equal to or greater than 1, and may be 4, for example. However, L=4 is just an example. In a case where the number of power supply OFF/ON operations exceeds L, the process ends.

It should be noted that, in the recovery process, more specifically, with respect to the restart of the mobile communication device 120, the monitoring unit 111 issues an instruction of the restart to OS using a command, and the restart is performed by a function of OS.

With respect to the restart of the communication normal-operation availability checking apparatus 100, the monitoring unit 111 issues a command of the restart to OS using a command, and the restart is performed by a function of OS.

Further, with respect to power supply OFF/ON operations of the communication normal-operation availability checking apparatus 100, the monitoring unit 111 issues an instruction of power supply stop/restart to the power supply control apparatus 130, and the power supply stop/restart operations are performed by a function of the power supply control apparatus 130.

Effects of Embodiment, Etc.

According to related techniques, in case of checking the normal-operation availability of international roaming services, manual operations are required, and thus, substantial time and efforts are needed. However, according to an embodiment of the present invention, it is possible to automatically check normal-operation availability by providing a communication normal-operation availability checking apparatus 100 at a local office, and it becomes possible to reduce a great amount of time and costs.

Embodiment Summary

According to an embodiment of the present invention, a communication normal-operation availability checking apparatus is provided for checking normal-operation availability of communications that go through a first network, a second network and a third network. The communication normal-operation availability checking apparatus includes: a list generation unit configured to generate a list including one or more carriers that provide a detectable first network; and a checking unit configured to check the normal-operation availability of the communications by executing a test that goes through the first network based on the list.

The list generated by the list generation unit includes, for example, one or more communication methods for each carrier, and the checking unit performs connection tests for each communication method for each carrier.

The communication normal-operation availability checking apparatus may further include a transmission unit configured to transmit a test result of the checking unit to a monitoring apparatus via a first communication-available network.

Further, in a case where the first network that can be used for transmission of the test result does not exist, the transmission unit may keep storing the test result until the first network that can be used is detected.

Further, the communication normal-operation availability checking apparatus may further include a recovery unit configured to restart a communication device in a case where the communication device in the communication normal-operation availability checking apparatus is not recognized, and restart the communication normal-operation availability checking apparatus in a case where a communication device in the communication normal-operation availability checking apparatus is not recognized even after the restart of the communication device.

In a case where the communication device is not recognized even after the restart of the communication normal-operation availability checking apparatus, the recovery unit may cause an external apparatus to stop and restart supplying power to the communication normal-operation availability checking apparatus.

The monitoring unit 111 in an embodiment of the present invention is an example of the above-described list generation unit, the checking unit, the transmission unit, and the recovery unit. Further, the overseas carrier network, the international relay network, and the domestic carrier network in an embodiment of the present invention are examples of the first network, the second network, and the third network, respectively. However, this is just an example, and the first network, the second network, the third network may be any network, respectively. For example, the first network, the second network, the third network may be a domestic access network, a domestic relay network, and a domestic access network in a country, respectively.

As described above, embodiments of the present invention have been described. However, the present invention is not limited to a specific embodiment, and may be modified and changed in various ways within the range of the subject matter of the present invention recited in the claims.

The present is based on and claims priority to Japanese patent application No. 2017-237113 filed on Dec. 11, 2017, the entire contents of which are incorporated herein by reference.

DESCRIPTION OF THE REFERENCE NUMERALS 100 communication normal-operation availability checking apparatus
110 CPU
111 monitoring unit
112 monitoring unit operation control unit
113 scheduler
120 mobile communication device
121 communication unit
122 connection unit
123 power supply unit
124 port
130 power supply control apparatus
131 power supply control unit
150 drive apparatus
151 recording medium
152 auxiliary storage apparatus
153 memory apparatus
154 CPU
155 interface apparatus
156 display apparatus
157 input apparatus
A, B, C overseas carrier network
300 international relay network
200 network connection apparatus
400 domestic carrier network
500 Internet
600 monitoring apparatus

What is claimed is:

1. A communication normal-operation availability checking apparatus for checking normal-operation availability of communications that go through a first network, a second network, and a third network, the communication normal-operation availability checking apparatus comprising:
   processing circuitry configured to
   generate a list including one or more carriers that can be detected and that provide a first network; and
   check normal-operation availability of the communications by performing a test that goes through the first network,
   wherein
   the processing circuitry is configured to restart a communication device in a case where the communication device in the communication normal-operation availability checking apparatus is not recognized, and to restart the communication normal-operation availability checking apparatus in a case where the communication device is not recognized even after the restart of the communication device.

2. The communication normal-operation availability checking apparatus according to claim 1, further comprising:
   a transmitter configured to transmit a test result, of the performed test through the first network, to a monitoring apparatus via a first communication-available network.

3. The communication normal-operation availability checking apparatus according to claim 2, wherein
   the transmitter keeps storing the test result until the first network that can be used is detected in a case where the first network that can be used for transmission of the test result does not exist.

4. The communication normal-operation availability checking apparatus according to claim 1, wherein
   the processing circuitry causes an external apparatus to stop and restart supplying power to the communication normal-operation availability checking apparatus in a case where the communication device is not recognized even after the restart of the communication normal-operation availability checking apparatus.

5. A communication normal-operation availability checking method for checking normal-operation availability of communications that go through a first network, a second network, and a third network, the communication normal-operation availability checking method comprising:
   generating a list including one or more carriers that can be detected and that provide a first network; and
   checking normal-operation availability of the communications by performing a test that goes through the first network based on the list,
   wherein
   the method includes restarting a communication device in a case where the communication device in the communication normal-operation availability checking apparatus is not recognized, and restarting the communication normal-operation availability checking apparatus in a case where the communication device is not recognized even after the restart of the communication device.

6. A non-transitory computer-readable recording medium having a program used for causing a computer to perform a communication normal-operation availability checking method for checking normal-operation availability of communications that go through a first network, a second network, and a third network, the communication normal-operation availability checking method comprising:
   generating a list including one or more carriers that can be detected and that provide a first network; and checking normal-operation availability of the communications by performing a test that goes through the first network based on the list, wherein the method includes restarting a communication device in a case where the communication device in the communication normal-operation availability checking apparatus is not recognized, and restarting the communication normal-operation availability checking apparatus in a case where the communication device is not recognized even after the restart of the communication device.

7. The communication normal-operation availability checking apparatus according to claim 1, wherein the generated list includes a plurality of communication methods for each carrier, and the processing circuitry performs a connection test for each communication method for each carrier.

\* \* \* \* \*